(12) United States Patent
Wei (10) Patent No.: US 9,677,204 B2
(45) Date of Patent: Jun. 13, 2017

(54) SUN CONTROL TEXTILE WITH HIGH TRANSMITTANCE AND MANUFACTURING METHOD THEREOF

(71) Applicant: RAINBOW PACKAGE INDUSTRIAL CO., LTD., Tainan (TW)

(72) Inventor: Tsan Fu Wei, Tainan (TW)

(73) Assignee: Rainbow Package Industrial Co., Ltd., Tainan (TW)

( * ) Notice: Subject to any disclaimer, the term of this patent is extended or adjusted under 35 U.S.C. 154(b) by 0 days.

(21) Appl. No.: 15/057,216

(22) Filed: Mar. 1, 2016

(65) Prior Publication Data

US 2017/0121867 A1    May 4, 2017

(30) Foreign Application Priority Data

Oct. 28, 2015   (TW) .............................. 104135416 A (51) Int. Cl.
| | | |
|---|---|---|
| *D03D 15/02* | (2006.01) | |
| *D03D 15/00* | (2006.01) | |
| *D03D 1/00* | (2006.01) | |
| *D03D 25/00* | (2006.01) | |

(52) U.S. Cl.
CPC ........... *D03D 1/00* (2013.01); *D03D 15/0088* (2013.01); *D03D 25/00* (2013.01); *D03D 15/00* (2013.01)

(58) Field of Classification Search
CPC ........ B29C 2793/0063; B29C 47/0021; B32B 7/02; D01D 5/426; D03D 15/00; D03D 15/0088
See application file for complete search history.

(56) References Cited

U.S. PATENT DOCUMENTS

| | | | | | |
|---|---|---|---|---|---|
| 3,577,724 | A | * | 5/1971 | Greene | D01D 5/423 225/3 |
| 3,801,407 | A | * | 4/1974 | Goldsworthy | B29C 31/00 156/181 |
| 3,985,600 | A | * | 10/1976 | Blais | B26F 1/20 156/229 |
| 4,557,958 | A | * | 12/1985 | Barkis | D06N 3/0038 156/244.11 |
| 4,594,276 | A | * | 6/1986 | Relyea | B44C 1/105 428/187 |
| 6,696,152 | B1 | * | 2/2004 | Lin | D01F 6/06 139/97 |
| 7,318,961 | B2 | * | 1/2008 | Loos | B29C 47/0014 264/173.15 |
| 8,629,204 | B2 | * | 1/2014 | Basfar | B29C 47/0021 524/107 |
| 2002/0155289 | A1 | * | 10/2002 | Cistone | B01D 39/04 428/371 |

(Continued)

*Primary Examiner* — Bobby Muromoto, Jr.
(74) *Attorney, Agent, or Firm* — Rosenberg, Klein & Lee (57) ABSTRACT

A sun control textile with high transmittance and a manufacturing method thereof. In the manufacturing method of the sun control textile, a high-performance sun control film is processed into slender filaments. The slender filaments are woven and assembled with other yarns by a weaving device to together form a sun control textile. The different connection manners of the sun control film yarns lead to different visible light transmittance and sun control effect of the sun control textile, whereby an excellent sun control textile with high transmittance can be achieved.

42 Claims, 12 Drawing Sheets

(56) References Cited

U.S. PATENT DOCUMENTS

| | | | | |
|---|---|---|---|---|
| 2003/0188480 A1* | 10/2003 | Whitcomb | ............ | A47G 7/085 47/72 |
| 2004/0087233 A1* | 5/2004 | Morin | .................... | D01D 5/426 442/301 |
| 2004/0224591 A1* | 11/2004 | Thai | ........................ | C08J 3/226 442/181 |
| 2004/0242103 A1* | 12/2004 | Loos | ................... | B29C 47/0014 442/185 |
| 2008/0063846 A1* | 3/2008 | Loos | ................... | B29C 47/0014 428/212 |
| 2009/0025872 A1* | 1/2009 | Nilsen | ................. | B29C 47/0014 156/278 |
| 2010/0033054 A1* | 2/2010 | Gologanu | ............. | H01L 41/082 310/309 |
| 2011/0034098 A1* | 2/2011 | Bouquerel | ........... | A63B 29/028 442/181 |
| 2012/0107527 A1* | 5/2012 | Auffermann | ............... | C08J 5/18 428/17 |
| 2012/0279029 A1* | 11/2012 | Basfar | ................. | B29C 47/0021 28/140 |
| 2013/0045346 A1* | 2/2013 | Lehmann | ................ | C08L 23/06 428/35.2 |
| 2014/0234597 A1* | 8/2014 | De Loos | ............. | B29C 47/0057 428/212 |

\* cited by examiner

| item<br>test serial number | ultraviolet resistivity | visible light transmittance | infrared resistivity |
|---|---|---|---|
| embodiment 1 | 86 | 54 | 74 |
| embodiment 2 | 80 | 60 | 69 |
| embodiment 3 | 89 | 52 | 84 |
| embodiment 4 | 85 | 54 | 77 |
| embodiment 5 | 86 | 55 | 79 |
| embodiment 6 | 85 | 56 | 70 |
| embodiment 7 | 85 | 61 | 76 |
| embodiment 8 | 81 | 54 | 70 |
| embodiment 9 | 91 | 65 | 87 |
| embodiment 10 | 84 | 60 | 76 |
| embodiment 11 | 85 | 61 | 77 |
| embodiment 12 | 83 | 61 | 71 |
| comparison embodiment 1 | 46 | 51 | 33 |
| comparison embodiment 2 | 51 | 51 | 39 |

Fig. 10

SUN CONTROL TEXTILE WITH HIGH TRANSMITTANCE AND MANUFACTURING METHOD THEREOF

BACKGROUND OF THE INVENTION

1. Field of the Invention

The present invention relates generally to a weaving technique of sun control textile, and more particularly to an excellent sun control textile with high transmittance to visible light and a manufacturing method thereof.

2. Description of the Related Art

Along with the speeding of globalization of economics, textile industries have faced strong competition and transition pressure. Therefore, it is necessary for the manufacturers to continuously enhance and integrate the conventional textile techniques and develop new products with added value so as to promote the competitive ability on the market. In the recent years, peoples not only require beautiful appearance of the textile products, but also demand various comfortable and protection functions in accordance with different environmental requirements. In view of such trend, multifunctional textiles have become the hottest products newly developed by the textile manufacturers.

In the conventional technique, in order to make the textiles have infrared-resisting ability and ultraviolet-resisting ability, the most often seen manner adopted by the manufacturers is to add various light blocking additives into the polymers. Then the polymers are manufactured into fibers. The fibers are then utilized to manufacture the textiles. Alternatively, the fibers with light blocking effect and light reflection film are combined and woven into the textile to achieve the sun control effect. However, in the case that the additives are added into the polymers, due to agglomeration, the distribution of the additives will be poor to affect the infrared resistance and ultraviolet resistance effects. Moreover, it is unsuitable to add different additives into the polymers together. Therefore, the fibers or textiles made by such method can only achieve limited infrared resistance and ultraviolet resistance functions. Furthermore, in the case the above light reflection film is combined with the fibers and woven together with the fibers to form the textile, the light reflection film used in the method is made of a polyester (PET) film the surface of which is coated with a thin layer containing metals such as nickel, silver, aluminum and chrome. Alternatively, a dyed thin layer containing inorganic dye is added to the PET film. Such light reflection film has excellent infrared resistance and ultraviolet resistance effects. However, such light reflection film will also totally block the visible light to greatly deteriorate the light transmittance. Similarly, the textile made of the light reflection film in combination with the fibers also has some shortcomings and is not idealistic.

In order to achieve the sun control and energy-saving effect, the conventional sun control film attachment sheet on the market must be affixed to a piece of glass or a transparent rigid material such as building glass and vehicle window. Due to the structure and material properties of the sun control film, it is impossible to add any figure onto the sun control film. Also, the selection of the color is quite limited. Moreover, once the sun control film is attached to the glass, the sun control film cannot be freely removed. Under such circumstance, in the condition that it is unnecessary to block the light, (such as in the winter with a colder weather requiring sunlight), the sun control film will contrarily block the sunlight to cause inconvenience in use.

SUMMARY OF THE INVENTION

It is therefore a primary object of the present invention to provide a sun control textile with high transmittance in visible light region and a manufacturing method thereof.

To achieve the above and other objects, the present invention provides a connection method between a sun control material and a textile. The textile has sun control effect as well as high transmittance. The present invention also provides a weaving method of the sun control textile. The weaving method of the sun control textile includes steps of:

(a) preparing materials, at least one energy-saving sun control film being selected, the sun control film being precut into sun control film slender filaments, the sun control film having a better infrared resistivity (higher than 80%) and/or ultraviolet resistivity (higher than 80%) and a visible light transmittance higher than 50%;

(b) weaving, multiple longitudinal yarns and/or the multiple latitudinal yarns being selected and longitudinally and latitudinally woven with the sun control film slender filaments by means of a weaving device to form the sun control textile.

According to the above weaving method, a textile with both sun control effect and high light transmittance can be achieved. At least one energy-saving sun control film is selected. The sun control film is precut into sun control film slender filaments. The sun control film slender filaments are woven with multiple longitudinal yarns and/or multiple latitudinal yarns to form the sun control textile with both sun control effect and high visible light transmittance.

The present invention can be best understood through the following description and accompanying drawings, wherein:

BRIEF DESCRIPTION OF THE DRAWINGS

FIG. 3 (FIGS. 3-1 to 3-2) is a view showing the structure of the textile of the present invention according to FIG. 1 corresponding to the flow chart of FIG. 2;

FIG. 5-1 is a plane view showing the structural form of a second preferred embodiment of the sun control textile of the present invention;

FIG. 5-2 is a plane view showing the structural form of a third preferred embodiment of the sun control textile of the present invention;

DETAILED DESCRIPTION OF THE PREFERRED EMBODIMENTS

Embodiment 1

Figure 1:
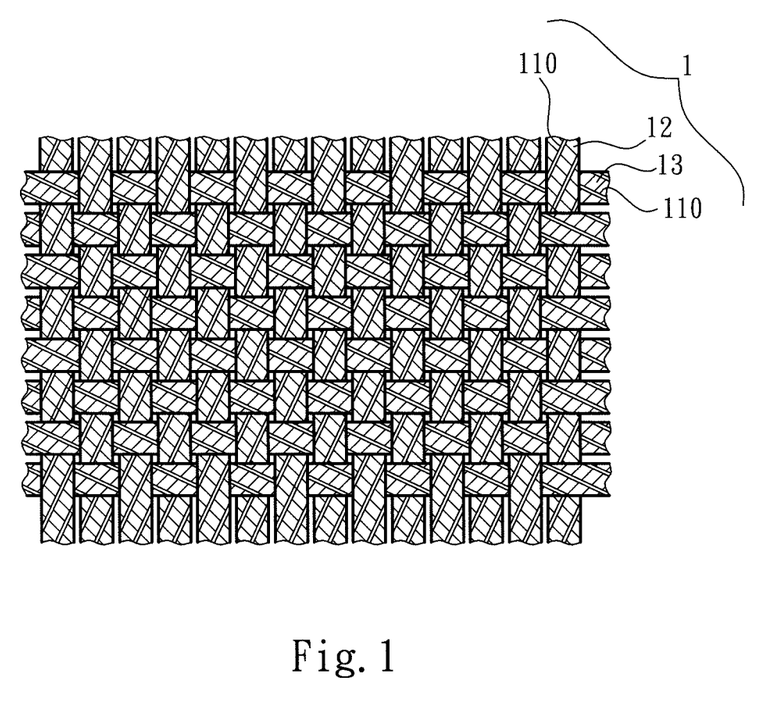
FIG. 1 is a plane view showing the structural form of a first preferred embodiment of the sun control textile of the present invention.
Figure 2:
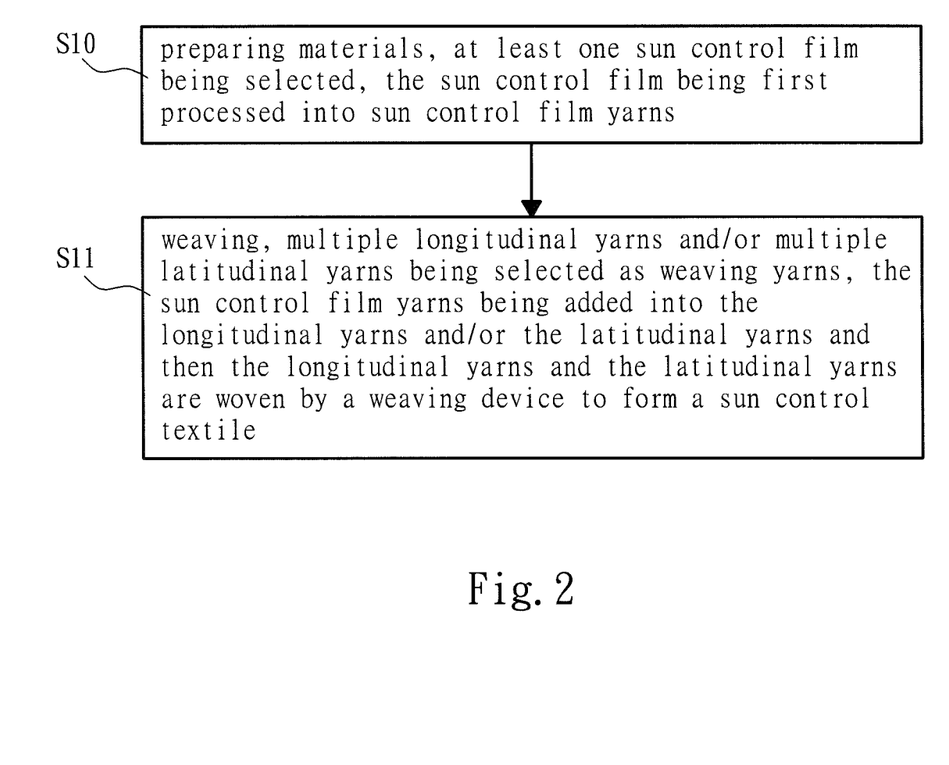
FIG. 2 is a flow chart of the manufacturing method of the sun control textile of the present invention according to FIG. 1.
Figure 4:
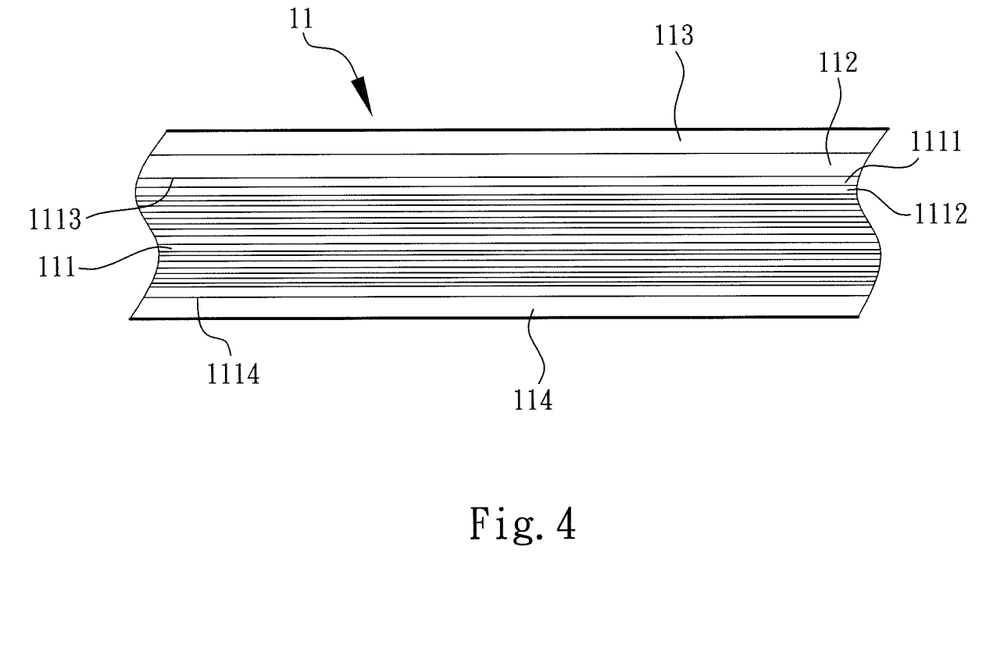
FIG. 4 is a view showing the structure of the preferred embodiment of the sun control film employed in the present invention.
Figure 10:
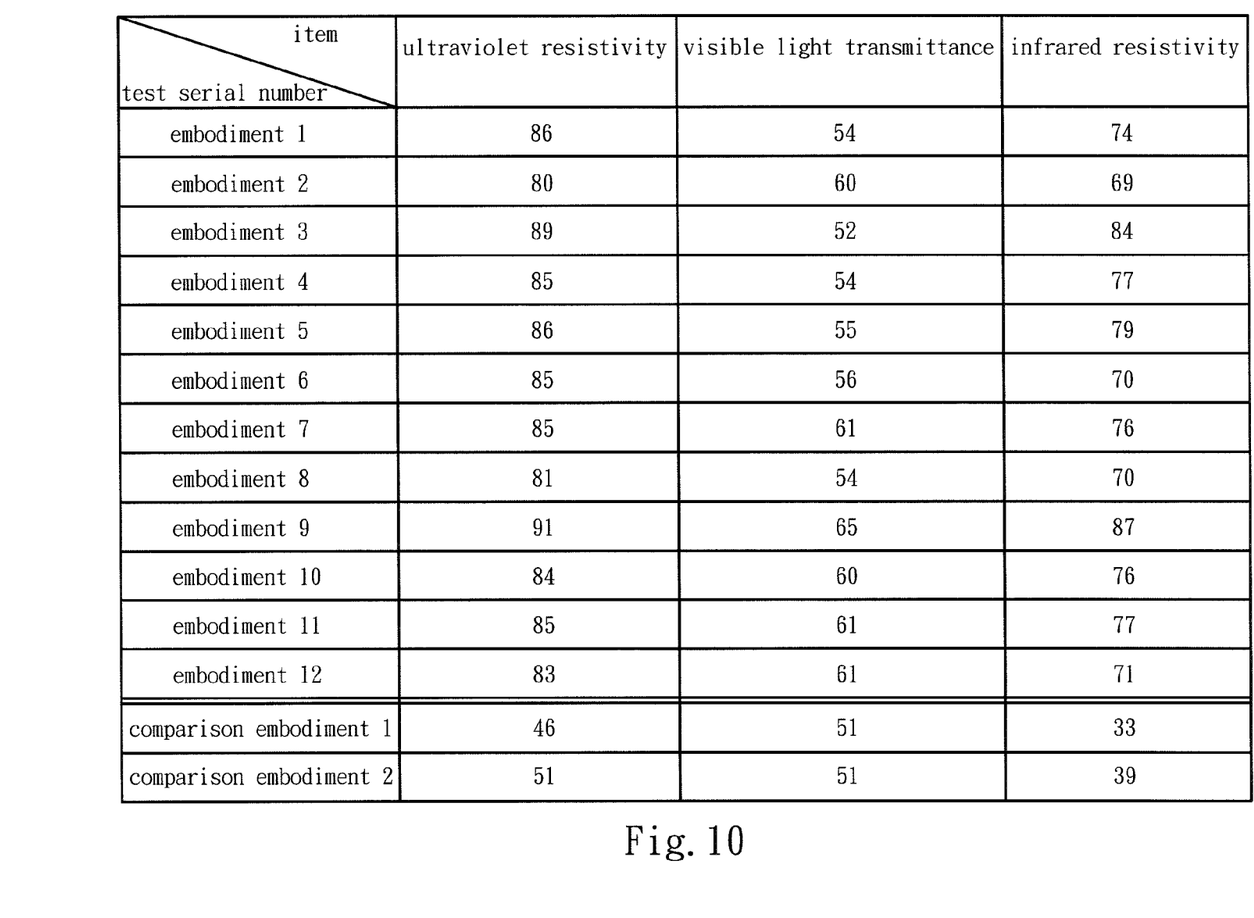
FIG. 10 is a property comparison table between the preferred embodiments of the sun control textile of the present invention and the existent textiles.
Figure 31:
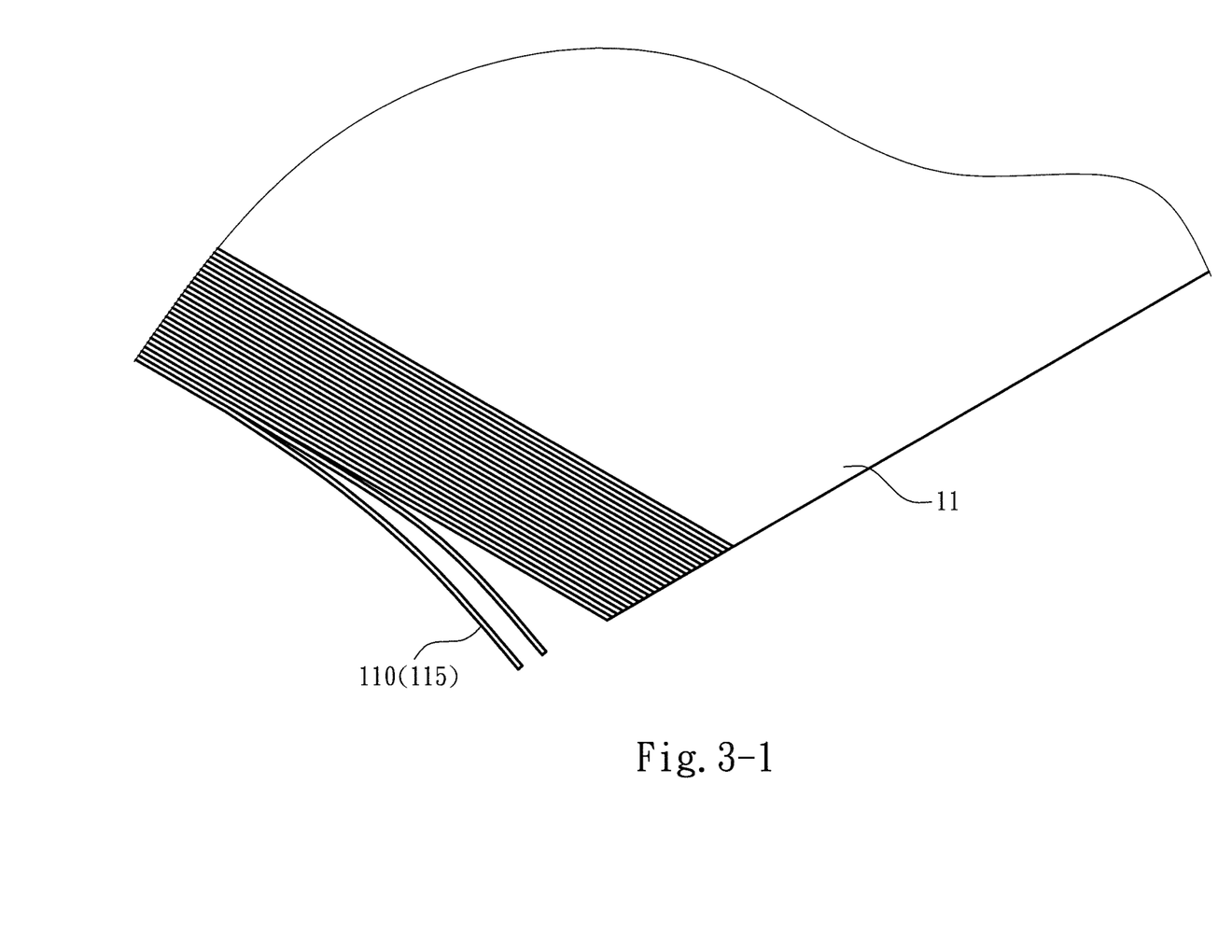
Figure 32:
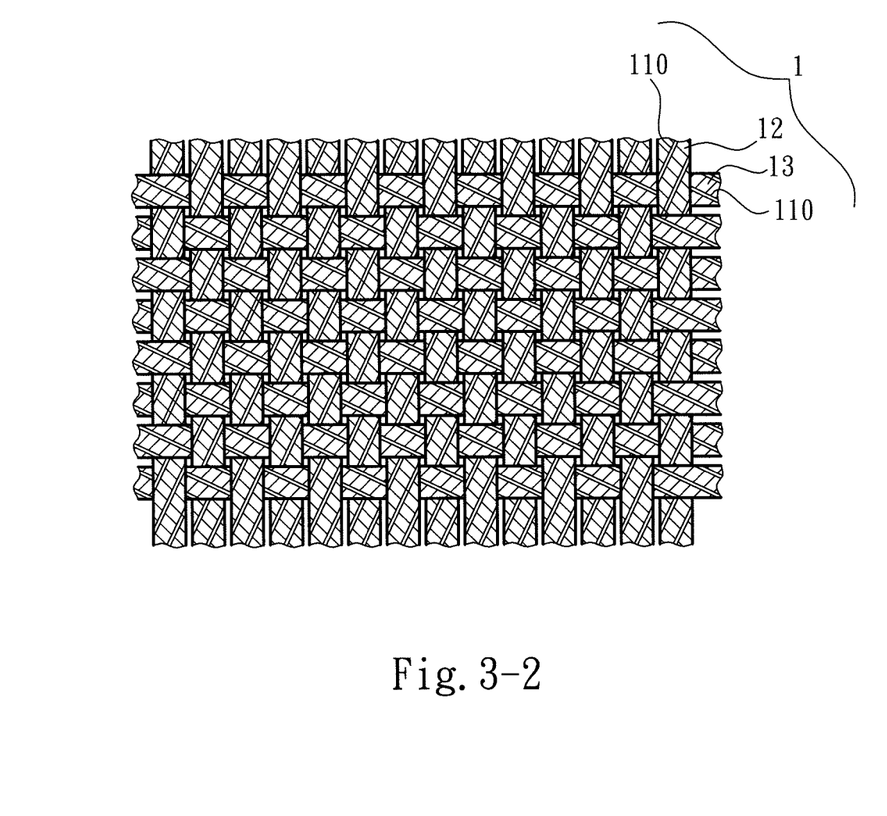

Please refer to FIG. 1, which is a view showing the structure of the sun control textile 1 with high transmittance to visible light of the present invention. FIGS. 2 and 3 (FIGS. 3-1 to 3-2) show the flow chart of the manufacturing method of the sun control textile 1 and the structure of the textile corresponding to the flow chart. The manufacturing method includes steps of:

S10. preparing materials (with reference to FIG. 3-1), at least one sun control film 11 being selected, preferably, the sun control film having an infrared resistivity higher than 80% and/or an ultraviolet resistivity higher than 80% and/or a visible light transmittance higher than 50%, for example, a multilayered sun control film attachment sheet, that has been widely used being employable, the sun control film 11 including a substrate unit 111 composed of totally 20~200 layers of laminated first substrate films 1111 and second substrate films 1112 different from the first substrate films 1111 in material, after laminated, the total thickness of the first and second substrate films 1111, 1112 being still within the range of the visible light wavelength, the substrate unit 111 having a first surface 1113 and a second surface 1114 spaced from the first surface 1113, the first substrate film 1111 being acrylic resin, while the second substrate film 1112 being polybutylene terephthalate or the copolymer thereof, an infrared resistant layer 112 being further bonded with the substrate unit 111, the infrared resistant layer 112 containing infrared resistant nano-order coating such as the resin containing tin antimony oxide and indium tin oxide, an ultraviolet resistant layer 114 being also bonded with the substrate unit 111, the infrared resistant layer 112 and the ultraviolet resistant layer 114 being respectively bonded to the first and second surfaces 1113, 1114 of the substrate unit 111, the ultraviolet resistant layer 114 containing ultraviolet resistant agent such as the resin containing benzotriazole, an anti-scrape wear layer 113 being selectively securely adhered to the infrared resistant layer 112 or the ultraviolet resistant layer 114, the anti-scrape wear layer 113 containing anti-scrape wear agent, which can be the resin containing lanthanum hexaboride, the sun control film 11 being tested with UV/VIS/NIR double-beam spectrophotometer (PerkinElmer LAMBDA 750) to obtain that the visible light transmittance is 70%, the infrared resistivity is 90% and ultraviolet resistivity is 90%, the sun control film 11 being first cut into a film roll with a width of 125 mm, then the film roll being transferred to a roller-type cutting machine and processed into different lengths of fibers with lengths ranging from 35 mm to 45 mm and fineness ranging from 1.5 d to 2 d, then, the fibers being twisted (twist factor 10) to form sun control film yarns 110 with a count number of 15/1; and S11. weaving, multiple longitudinal yarns 12 and/or multiple latitudinal yarns 13 being employed as the weaving yarns, the weaving yarns with the sun control film yarns 110 being longitudinally and latitudinally woven by means of a weaving device, that is, the sun control film yarns 110 being respectively blended and twisted with the multiple longitudinal yarns 12 and/or multiple latitudinal yarns 13 and then the longitudinal yarns 12 and/or the latitudinal yarns 13 being woven to achieve a sun control textile 1 with 42×42 yarns. The sun control textile 1 is composed of the multiple longitudinal yarns 12 and/or the multiple latitudinal yarns 13, which are woven in tatting manner or knitting manner. (In this embodiment, the sun control textile 1 is made by means of tatting as shown in the drawings). Accordingly, in case the sun control textile 1 is tested, the visible light transmittance of the textile is found 54%, the infrared resistivity is found 74% and the ultraviolet resistivity is found 86%. The test results are listed in the column of embodiment 1 of FIG. 10.

Embodiment 2

The steps and composition materials and structure of the second embodiment are substantially identical to those of the first embodiment. The second embodiment is different from the first embodiment in that in step S10 of preparing materials, the sun control film fibers being twisted to form sun control film yarns 110 with a count number of 30/1 and then woven. Accordingly, in case the manufactured sun control textile 1 is also tested, the visible light transmittance of the textile is found 60%, the infrared resistivity is found 69% and the ultraviolet resistivity is found 80%. The test results are listed in the column of embodiment 2 of FIG. 10.

Embodiment 3

The steps and composition materials and structure of the third embodiment are substantially identical to those of the first embodiment. The third embodiment is different from the first embodiment in that in step S10 of preparing materials, the sun control film fibers being twisted to form sun control film yarns 110 with a count number of 10/1 and then woven. Accordingly, in case the manufactured sun control textile 1 is also tested, the visible light transmittance of the textile is found 52%, the infrared resistivity is found 84% and the ultraviolet resistivity is found 89%. The test results are listed in the column of embodiment 3 of FIG. 10.

Embodiment 4

The steps of the fourth embodiment are substantially identical to those of the first embodiment. The fifth embodiment is different from the first embodiment in that the sun control film 11 is selectively a 3M M70 sun control film. The sun control film 11 is first cut into a film roll with a width of 125 mm. Then, the film roll is transferred to a roller-type cutting machine to process the sun control film into different lengths of fibers with lengths ranging from 35 mm to 45 mm and fineness ranging from 1.5 d to 2 d. Then, the fibers are twisted (twist factor 10) to form the sun control film yarns 110 with a count number of 15/1. Then, after performing the weaving step to the sun control film yarns 110 as in the first embodiment, the sun control textile 1 is achieved. The sun control textile 1 is tested to reveal that the visible light transmittance of the textile 1 is 54%, the infrared resistivity is 77% and the ultraviolet resistivity is 85%. The test results are listed in the column of embodiment 4 of FIG. 10.

Embodiment 5

The steps of the fifth embodiment are substantially identical to those of the first embodiment. The fifth embodiment is different from the first embodiment in that the sun control film 11 is selectively a Southwall V-CooL v70 sun control film. The sun control film 11 is first cut into a film roll with a width of 125 mm. Then, the film roll is transferred to a roller-type cutting machine to process the sun control film into different lengths of fibers with lengths ranging from 35 mm to 45 mm and fineness ranging from 1.5 d to 2 d. Then, the fibers are twisted (twist factor 10) to form the sun control film yarns 110 with a count number of 15/1. Then, after performing the weaving step to the sun control film yarns 110 as in the first embodiment, the sun control textile 1 is achieved. The sun control textile 1 is tested to reveal that the visible light transmittance of the textile 1 is 55%, the infrared resistivity is 79% and the ultraviolet resistivity is 86%. The test results are listed in the column of embodiment 5 of FIG. 10.

Embodiment 6

The steps of the sixth embodiment are substantially identical to those of the first embodiment. The sixth embodiment is different from the first embodiment in that the selected at least one sun control film 11 is a Lintec FSKII 800 sun control film. The sun control film 11 is first cut into a film roll with a width of 125 mm. Then, the film roll is transferred to a roller-type cutting machine to process the sun control film into different lengths of fibers with lengths ranging from 35 mm to 45 mm and fineness ranging from 1.5 d to 2 d. Then, the fibers are twisted (twist factor 10) to form the sun control film yarns 110 with a count number of 15/1. Then, after performing the weaving step to the sun control film yarns 110 as in the first embodiment, the sun control textile 1 is achieved. The sun control textile 1 is tested to reveal that the visible light transmittance of the textile 1 is 56%, the infrared resistivity is 70% and the ultraviolet resistivity is 85%. The test results are listed in the column of embodiment 6 of FIG. 10.

Embodiment 7

Figure 6:
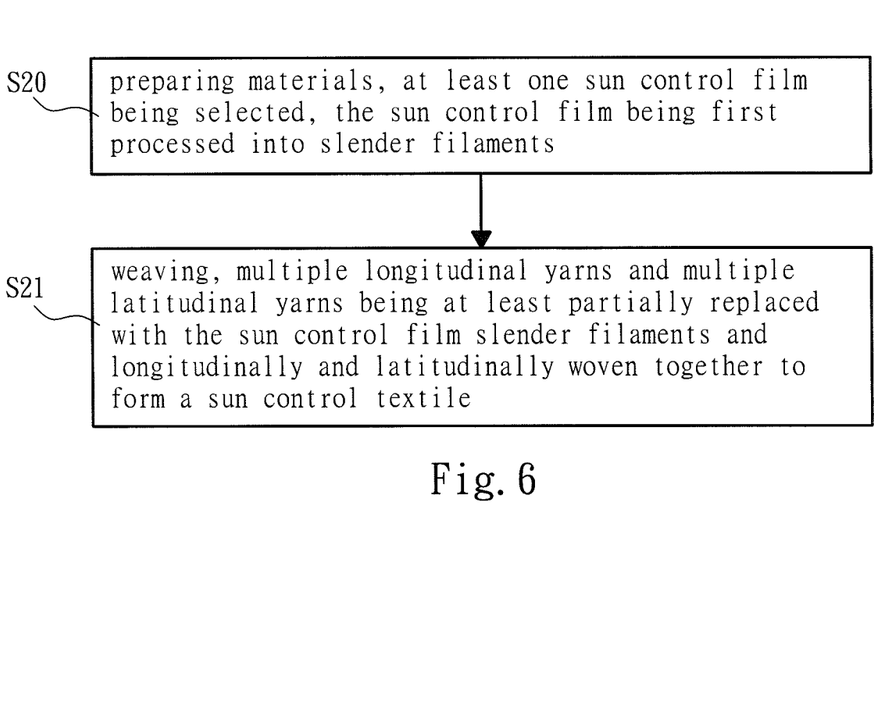
FIG. 6 is a flow chart of the manufacturing method of the sun control textile of the present invention according to FIGS. 5-1 and 5-2.
Figure 51:
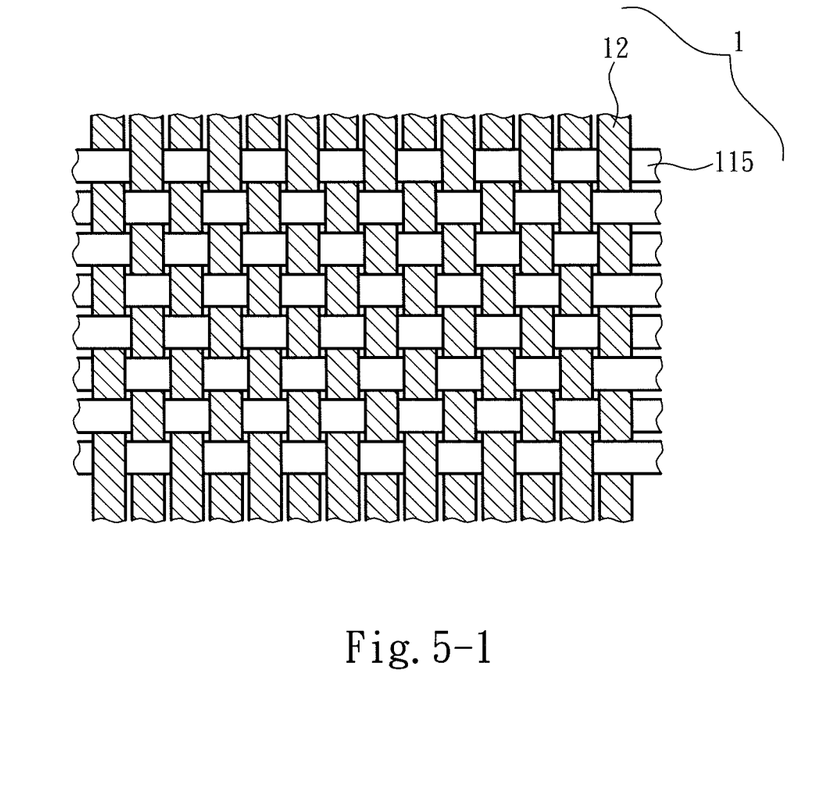
Figure 52:
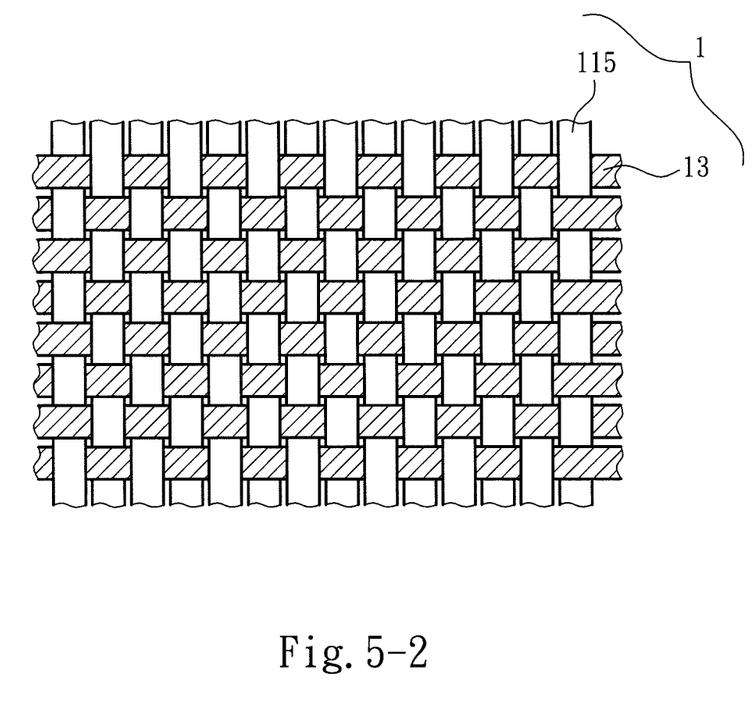

Please refer to FIGS. 5-1, 5-2 and 6. FIG. 6 is a flow chart of another weaving method of the sun control textile 1 of the present invention. The manufacturing method includes steps of:

S20. preparing materials, a sun control film 11 being selected, the sun control film 11 having the same material and structure as the sun control film of the first embodiment (with reference to FIG. 4) and having the same visible light transmittance, infrared resistivity and ultraviolet resistivity, the sun control film 11 being first cut into a film roll with a width of 145 mm, then, the film roll being transferred to a shredder to process the sun control film at a linear rate of 90 M/min into slender filaments 115 with a width of 1 mm; and S21. weaving, multiple longitudinal yarns 12 (or multiple latitudinal yarns 13 as shown in FIG. 5-2) being at least partially replaced with the sun control film slender filaments 115 and longitudinally and latitudinally woven together by means of a weaving device to achieve a sun control textile 1 with 64×42 filaments.

In step S21, the longitudinal yarns 12 are short-fiber polyester yarns with a count number of 30 s/2. In addition, the sun control textile 1 is woven from the slender filaments 115 of the sun control film 11 and the multiple longitudinal yarns 12 (or multiple latitudinal yarns 13) by means of tatting manner or knitting manner. (In this embodiment, the sun control textile 1 is made by means of tatting as shown in the drawings). Accordingly, in case the woven sun control textile 1 is tested, the visible light transmittance of the textile is found 61%, the infrared resistivity is found 76% and the ultraviolet resistivity is found 85%. The test results are listed in the column of embodiment 7 of FIG. 10.

Embodiment 8

The steps and composition materials and structure of the eighth embodiment are substantially identical to those of the seventh embodiment. The eight embodiment is different from the seventh embodiment in that in step S20 of preparing materials, the sun control film is processed by the shredder into slender filaments 115 with a width of 0.254 mm and then woven. The woven sun control textile 1 is also tested to reveal that the visible light transmittance of the textile 1 is 54%, the infrared resistivity is 70% and the ultraviolet resistivity is 81%. The test results are listed in the column of embodiment 8 of FIG. 10.

Embodiment 9

The steps and composition materials and structure of the ninth embodiment are substantially identical to those of the seventh embodiment. The ninth embodiment is different from the seventh embodiment in that in step S20 of preparing materials, the sun control film is processed by the shredder into slender filaments 115 with a width of 2 mm and then woven. The manufactured sun control textile 1 is tested to reveal that the visible light transmittance of the textile 1 is 65%, the infrared resistivity is 87% and the ultraviolet resistivity is 91%. The test results are listed in the column of embodiment 9 of FIG. 10.

Embodiment 10

The steps of the tenth embodiment are substantially identical to those of the seventh embodiment. The tenth embodiment is different from the seventh embodiment in that the sun control film 11 is selectively a 3M M70 sun control film. The sun control film 11 is first cut into a film roll with a width of 145 mm. Then, the film roll is transferred to a shredder to process the sun control film at a linear rate of 90 M/min into slender filaments 115 with a width of 1 mm. After performing the weaving step to the sun control film slender filaments 115 as in the seventh embodiment, the sun control textile 1 is achieved. The sun control textile 1 is also tested to reveal that the visible light transmittance of the textile 1 is 60%, the infrared resistivity is 76% and the ultraviolet resistivity is 84%. The test results are listed in the column of embodiment 10 of FIG. 10.

Embodiment 11

The steps of the eleventh embodiment are substantially identical to those of the seventh embodiment. The eleventh embodiment is different from the seventh embodiment in that the sun control film 11 is selectively a Southwall V-CooL v70 sun control film. The sun control film 11 is first cut into a film roll with a width of 145 mm. Then, the film roll is transferred to a shredder to process the sun control film at a linear rate of 90 M/min into slender filaments 115 with a width of 1 mm. After performing the weaving step to the sun control film slender filaments 115 as in the seventh embodiment, the sun control textile 1 is achieved. The sun control textile 1 is also tested to reveal that the visible light transmittance of the textile 1 is 61%, the infrared resistivity is 77% and the ultraviolet resistivity is 85%. The test results are listed in the column of embodiment 11 of FIG. 10.

Embodiment 12

The steps of the twelfth embodiment are substantially identical to those of the seventh embodiment. The twelfth embodiment is different from the seventh embodiment in that the sun control film 11 is selectively a Lintec FSKII 800 sun control film. The sun control film 11 is first cut into a film roll with a width of 145 mm. Then, the film roll is transferred to a shredder to process the sun control film at a linear rate of 90 M/min into slender filaments 115 with a width of 1 mm. After performing the weaving step to the sun control film slender filaments 115 as in the seventh embodiment, the sun control textile 1 is achieved. The sun control textile 1 is also tested to reveal that the visible light transmittance of the textile 1 is 61%, the infrared resistivity is 71% and the ultraviolet resistivity is 83%. The test results are listed in the column of embodiment 12 of FIG. 10.

Comparison Embodiment 1

The steps of the first comparison embodiment are substantially identical to those of the first embodiment. The first comparison embodiment is different from the first embodiment in that in the step of preparing materials, both the multiple longitudinal yarns 12 and/or multiple latitudinal yarns 13 are short-fiber polyester yarns with a count number of 15/1. After performing the weaving step to the yarns as in the first embodiment, a textile is achieved. The textile is tested to reveal that the visible light transmittance of the textile is 51%, the infrared resistivity is 33% and the ultraviolet resistivity is 46%. The test results are listed in the column of comparison embodiment 1 of FIG. 10. It can be known from the data of embodiment 1 to embodiment 6 and the data of the first comparison embodiment that all the infrared resistivity, the ultraviolet resistivity and the visible light transmittance of the textile made of the sun control film yarns 110 are higher than the infrared resistivity, the ultraviolet resistivity and the visible light transmittance of the textile of the first comparison embodiment. Moreover, the smaller the count number of the sun control film yarns is, the better the infrared resistivity and the ultraviolet resistivity of the textile are.

Comparison Embodiment 2

The steps of the second comparison embodiment are substantially identical to those of the seventh embodiment. The second comparison embodiment is different from the seventh embodiment in that in the step of preparing materials, both the multiple longitudinal yarns 12 and/or multiple latitudinal yarns 13 are short-fiber polyester yarns with a count number of 30 s/2. After performing the weaving step to the yarns as in the seventh embodiment, a textile is achieved. The textile is tested to reveal that the visible light transmittance of the textile is 51%, the infrared resistivity is 39% and the ultraviolet resistivity is 51%. The test results are listed in the column of comparison embodiment 2 of FIG. 10. It can be known from the data of embodiment 7 to embodiment 12 and the data of the second comparison embodiment that all the infrared resistivity, the ultraviolet resistivity and the visible light transmittance of the textile made of the sun control film slender filaments 115 are higher than the infrared resistivity, the ultraviolet resistivity and the visible light transmittance of the textile of the second comparison embodiment. Moreover, the wider the sun control film slender filaments 115 are, the better the ultraviolet resistivity, the visible light transmittance and the infrared resistivity of the textile are. According to the current weaving technique, in case the width of the sun control film slender filaments is set within a range of 0.1 mm~10 mm, a better application state can be achieved.

According to the above description, the primary object of the present invention is to provide a weaving technique for a textile with sun control ability and high light transmittance. The selected energy-saving sun control film is first processed into slender filaments. Then, the slender filaments are woven with multiple longitudinal yarns and/or multiple latitudinal yarns to achieve a textile. The different textiles have different extents of sun control effects and the visible light transmittance, the infrared resistivity and the ultraviolet resistivity of the sun control textile are obviously affected.

Figure 7:
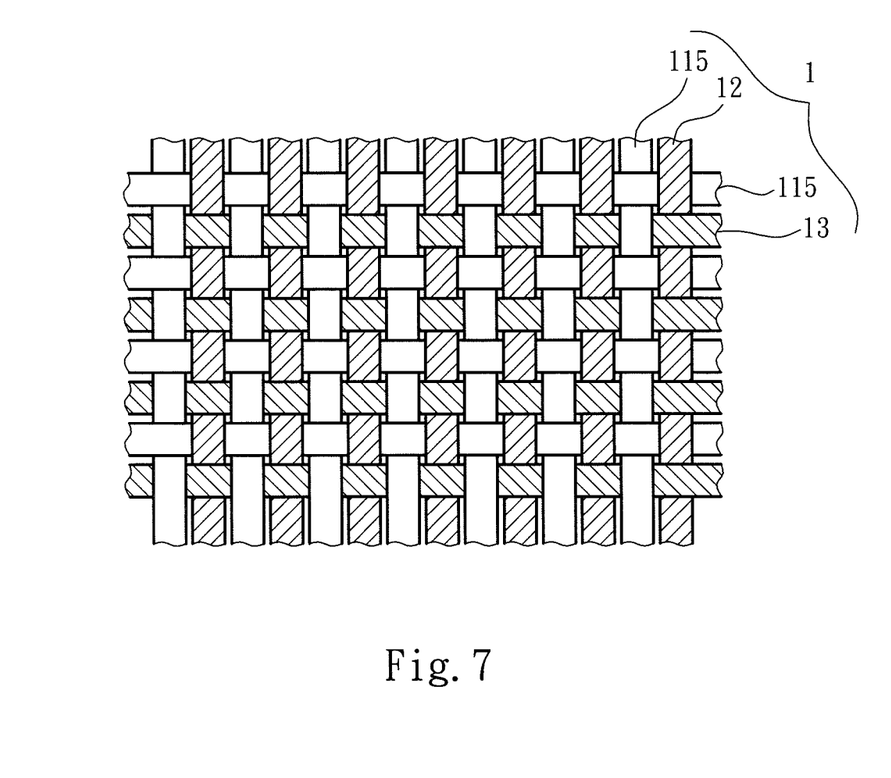
FIG. 7 is a plane view showing the structural form of a fourth preferred embodiment of the sun control textile of the present invention.
Figure 8:
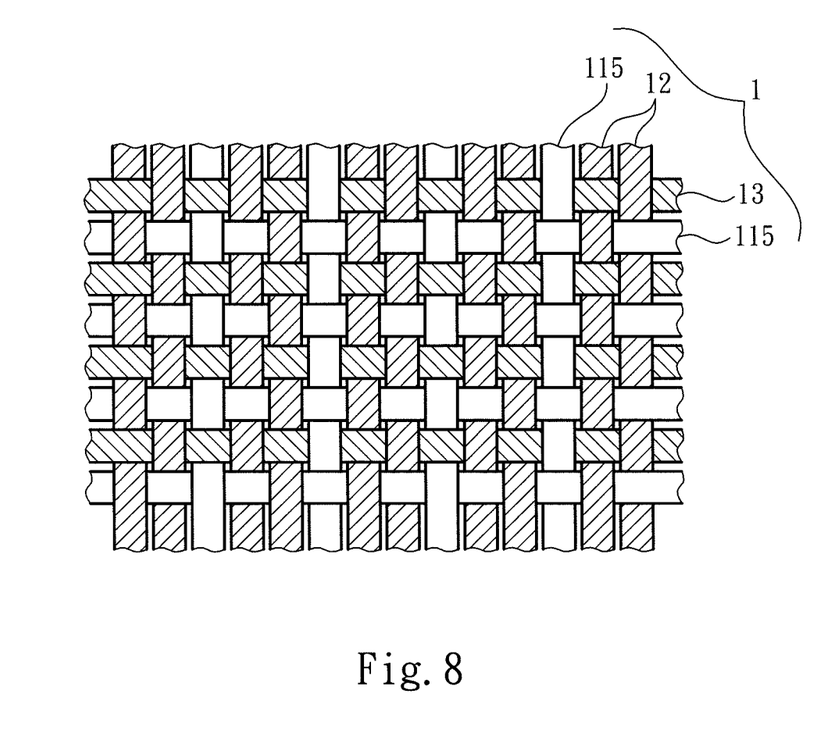
FIG. 8 is a plane view showing the structural form of a fifth preferred embodiment of the sun control textile of the present invention.
Figure 9:
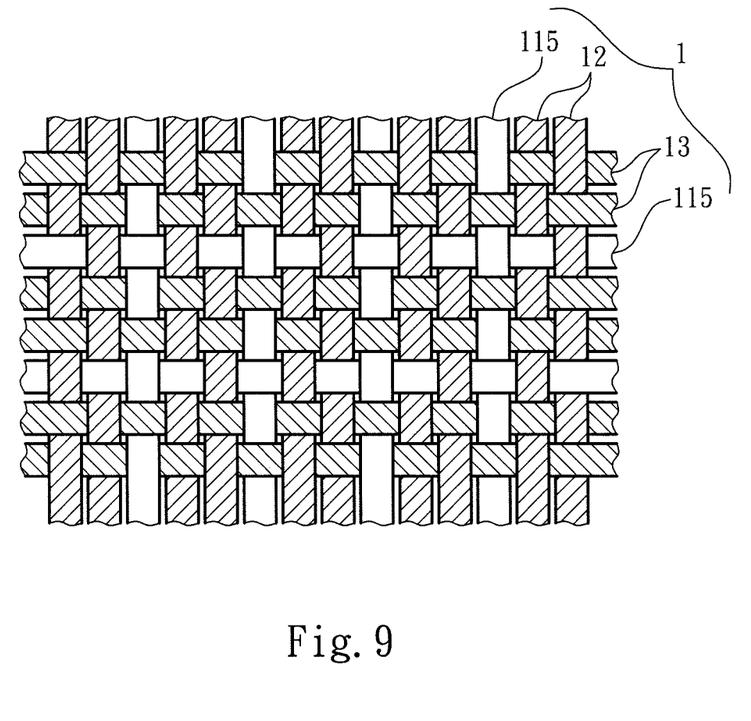
FIG. 9 is a plane view showing the structural form of a sixth preferred embodiment of the sun control textile of the present invention.

Please now refer to FIGS. 7 to 9. The longitudinal yarns 12 and/or latitudinal yarns 13 are partially replaced with the sun control film slender filaments 115 and then longitudinally and latitudinally woven together to achieve a sun control textile 1. Both can achieve very good visible light transmittance, ultraviolet resistivity and infrared resistivity.

In conclusion, the present invention is truly widely utilizable in relevant industries and is greatly inventive and advanced.

The above embodiments are only used to illustrate the present invention, not intended to limit the scope thereof. Many modifications of the above embodiments can be made without departing from the spirit of the present invention.

What is claimed is:

1. A manufacturing method of sun control textile with high transmittance, comprising steps of:
    (a) preparing materials, at least one sun control film with a visible light transmittance higher than 50% being selected, the sun control film having at least one of two effects of infrared resistance and ultraviolet resistance, the sun control film being processed into sun control film yarns; and
    (b) weaving, at least one of multiple longitudinal yarns and multiple latitudinal yarns being blended and twisted with the sun control film yarns, then, the longitudinal yarns and the latitudinal yarns being woven to form a sun control textile.

2. The manufacturing method of sun control textile with high transmittance as claimed in claim 1, wherein the sun control film yarns are formed of different lengths of fibers processed from the sun control film with lengths ranging from 35 mm to 45 mm and fineness ranging from 1.5 d to 2 d, the fibers being twisted to form the sun control film yarns with a count number of 15/1.

3. The manufacturing method of sun control textile with high transmittance as claimed in claim 1, wherein the sun control film yarns are formed of different lengths of fibers processed from the sun control film with lengths ranging from 35 mm to 45 mm and fineness ranging from 1.5 d to 2 d, the fibers being twisted to form the sun control film yarns with a count number of 30/1.

4. The manufacturing method of sun control textile with high transmittance as claimed in claim 1, wherein the sun control film yarns are formed of different lengths of fibers processed from the sun control film with lengths ranging from 35 mm to 45 mm and fineness ranging from 1.5 d to 2 d, the fibers being twisted to form the sun control film yarns with a count number of 10/1.

5. The manufacturing method of sun control textile with high transmittance as claimed in claim 1, wherein an anti-scrape wear layer is further disposed on an outer surface of the sun control film.

6. The manufacturing method of sun control textile with high transmittance as claimed in claim 1, wherein the sun control film includes a substrate unit, the substrate unit being at least composed of 20-200 layers of laminated first substrate films and second substrate films made of different materials, the substrate unit having a first surface and a second surface, an infrared resistant layer being disposed on at least one of the first and second surfaces.

7. The manufacturing method of sun control textile with high transmittance as claimed in claim 5, wherein the sun control film includes a substrate unit, the substrate unit being at least composed of 20~200 layers of laminated first substrate films and second substrate films made of different materials, the substrate unit having a first surface and a second surface, an infrared resistant layer being disposed on at least one of the first and second surfaces.

8. The manufacturing method of sun control textile with high transmittance as claimed in claim 1, wherein at least one of the infrared resistivity and the ultraviolet resistivity of the sun control film is higher than 80%.

9. The manufacturing method of sun control textile with high transmittance as claimed in claim 5, wherein at least one of the infrared resistivity and the ultraviolet resistivity of the sun control film is higher than 80%.

10. The manufacturing method of sun control textile with high transmittance as claimed in claim 6, wherein at least one of the infrared resistivity and the ultraviolet resistivity of the sun control film is higher than 80%.

11. The manufacturing method of sun control textile with high transmittance as claimed in claim 7, wherein at least one of the infrared resistivity and the ultraviolet resistivity of the sun control film is higher than 80%.

12. A sun control textile with high transmittance, the sun control textile being a textile woven from multiple longitudinal yarns and multiple latitudinal yarns, the sun control film yarns being blended and twisted with at least one of the multiple longitudinal yarns and the multiple latitudinal yarns.

13. The sun control textile with high transmittance as claimed in claim 12, wherein the sun control film yarns are formed of different lengths of fibers processed from the sun control film with lengths ranging from 35 mm to 45 mm and fineness ranging from 1.5 d to 2 d, the fibers being twisted to form the sun control film yarns with a count number of 15/1.

14. The sun control textile with high transmittance as claimed in claim 12, wherein the sun control film yarns are formed of different lengths of fibers processed from the sun control film with lengths ranging from 35 mm to 45 mm and fineness ranging from 1.5 d to 2 d, the fibers being twisted to form the sun control film yarns with a count number of 30/1.

15. The sun control textile with high transmittance as claimed in claim 12, wherein the sun control film yarns are formed of different lengths of fibers processed from the sun control film with lengths ranging from 35 mm to 45 mm and fineness ranging from 1.5 d to 2 d, the fibers being twisted to form the sun control film yarns with a count number of 10/1.

16. The sun control textile with high transmittance as claimed in claim 12, wherein an anti-scrape wear layer is further disposed on an outer surface of the sun control film.

17. The sun control textile with high transmittance as claimed in claim 12, wherein the sun control film includes a substrate unit, the substrate unit being at least composed of 20~200 layers of laminated first substrate films and second substrate films made of different materials, the substrate unit having a first surface and a second surface, an infrared resistant layer being disposed on at least one of the first and second surfaces.

18. The sun control textile with high transmittance as claimed in claim 16, wherein the sun control film includes a substrate unit, the substrate unit being at least composed of 20~200 layers of laminated first substrate films and second substrate films made of different materials, the substrate unit having a first surface and a second surface, an infrared resistant layer being disposed on at least one of the first and second surfaces.

19. The sun control textile with high transmittance as claimed in claim 12, wherein at least one of the infrared resistivity and the ultraviolet resistivity of the sun control film is higher than 80%.

20. The sun control textile with high transmittance as claimed in claim 16, wherein at least one of the infrared resistivity and the ultraviolet resistivity of the sun control film is higher than 80%.

21. The sun control textile with high transmittance as claimed in claim 17, wherein at least one of the infrared resistivity and the ultraviolet resistivity of the sun control film is higher than 80%.

22. The sun control textile with high transmittance as claimed in claim 18, wherein at least one of the infrared resistivity and the ultraviolet resistivity of the sun control film is higher than 80%.

23. A manufacturing method of sun control textile with high transmittance, comprising steps of:
  (a) preparing materials, at least one sun control film with a visible light transmittance higher than 50% being selected, the sun control film having at least one of two effects of infrared resistance and ultraviolet resistance, the sun control film being processed into slender filaments; and
  (b) weaving, multiple longitudinal yarns and multiple latitudinal yarns being at least partially replaced with the sun control film slender filaments and longitudinally and latitudinally woven together to form a sun control textile.

24. The manufacturing method of sun control textile with high transmittance as claimed in claim 23, wherein the sun control film slender filament has a width ranging from 0.1 mm to 10 mm.

25. The manufacturing method of sun control textile with high transmittance as claimed in claim 23, wherein an anti-scrape wear layer is further disposed on an outer surface of the sun control film.

26. The manufacturing method of sun control textile with high transmittance as claimed in claim 24, wherein an anti-scrape wear layer is further disposed on an outer surface of the sun control film.

27. The manufacturing method of sun control textile with high transmittance as claimed in claim 23, wherein the sun control film includes a substrate unit, the substrate unit being at least composed of 20~200 layers of laminated first substrate films and second substrate films made of different materials, the substrate unit having a first surface and a second surface, an infrared resistant layer being disposed on at least one of the first and second surfaces.

28. The manufacturing method of sun control textile with high transmittance as claimed in claim 25, wherein the sun control film includes a substrate unit, the substrate unit being at least composed of 20~200 layers of laminated first substrate films and second substrate films made of different materials, the substrate unit having a first surface and a second surface, an infrared resistant layer being disposed on at least one of the first and second surfaces.

29. The manufacturing method of sun control textile with high transmittance as claimed in claim 23, wherein at least one of the infrared resistivity and the ultraviolet resistivity of the sun control film is higher than 80%.

30. The manufacturing method of sun control textile with high transmittance as claimed in claim 25, wherein at least one of the infrared resistivity and the ultraviolet resistivity of the sun control film is higher than 80%.

31. The manufacturing method of sun control textile with high transmittance as claimed in claim 27, wherein at least one of the infrared resistivity and the ultraviolet resistivity of the sun control film is higher than 80%.

32. The manufacturing method of sun control textile with high transmittance as claimed in claim 28, wherein at least one of the infrared resistivity and the ultraviolet resistivity of the sun control film is higher than 80%.

33. A sun control textile with high transmittance, the sun control textile being a textile woven from multiple longitudinal yarns and multiple latitudinal yarns, at least one of the multiple longitudinal yarns and the multiple latitudinal yarns being partially replaced with sun control film slender filaments.

34. The sun control textile with high transmittance as claimed in claim 33, wherein the sun control film slender filament has a width ranging from 0.1 mm to 10 mm.

35. The sun control textile with high transmittance as claimed in claim 33, wherein an anti-scrape wear layer is further disposed on an outer surface of the sun control film.

36. The sun control textile with high transmittance as claimed in claim 34, wherein an anti-scrape wear layer is further disposed on an outer surface of the sun control film.

37. The sun control textile with high transmittance as claimed in claim 33, wherein the sun control film includes a substrate unit, the substrate unit being at least composed of 20~200 layers of laminated first substrate films and second substrate films made of different materials, the substrate unit having a first surface and a second surface, an infrared resistant layer being disposed on at least one of the first and second surfaces.

38. The sun control textile with high transmittance as claimed in claim 35, wherein the sun control film includes a substrate unit, the substrate unit being at least composed of 20~200 layers of laminated first substrate films and second substrate films made of different materials, the substrate unit having a first surface and a second surface, an infrared resistant layer being disposed on at least one of the first and second surfaces.

39. The sun control textile with high transmittance as claimed in claim 33, wherein at least one of the infrared resistivity and the ultraviolet resistivity of the sun control film is higher than 80%.

40. The sun control textile with high transmittance as claimed in claim 35, wherein at least one of the infrared resistivity and the ultraviolet resistivity of the sun control film is higher than 80%.

41. The sun control textile with high transmittance as claimed in claim 37, wherein at least one of the infrared resistivity and the ultraviolet resistivity of the sun control film is higher than 80%.

42. The sun control textile with high transmittance as claimed in claim 38, wherein at least one of the infrared resistivity and the ultraviolet resistivity of the sun control film is higher than 80%.

* * * * *